G. F. CRIPPEN.
MEANS FOR DETACHABLY SECURING GEAR WHEELS TO SHAFTS.
APPLICATION FILED DEC. 1, 1916.
1,262,924.
Patented Apr. 16, 1918.
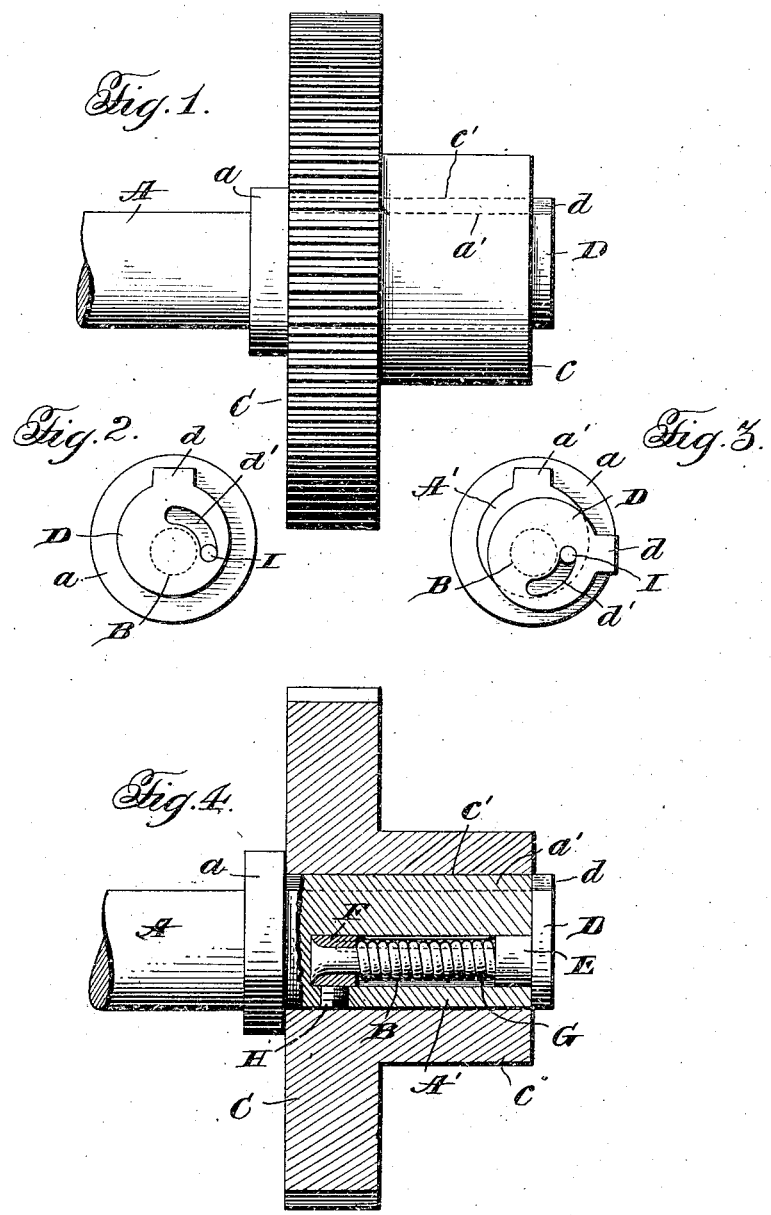

UNITED STATES PATENT OFFICE.

GEORGE F. CRIPPEN, OF YPSILANTI, MICHIGAN.

MEANS FOR DETACHABLY SECURING GEAR-WHEELS TO SHAFTS.

1,262,924.　　　　　Specification of Letters Patent.　　Patented Apr. 16, 1918.

Application filed December 1, 1916. Serial No. 134,382.

*To all whom it may concern:*

Be it known that I, GEORGE F. CRIPPEN, a citizen of the United States, residing at Ypsilanti, in the county of Washtenaw and State of Michigan, have invented certain new and useful Improvements in Means for Detachably Securing Gear-Wheels to Shafts, of which the following is a specification, reference being had therein to the accompanying drawing.

This invention relates to an improved means for detachably securing gear wheels to shafts.

Heretofore when it has been found desirable to change the size of gearing with a view of securing different speeds for machine parts it has been found somewhat inconvenient and laborious to make the change.

The present invention is designed as a simple and effective means for permitting the removal of splined gears to shafts and for retaining the gears in place when adjusted to the shafts.

In the accompanying drawing there is illustrated a form of the invention which will serve the purpose intended, but it is to be understood that minor changes can be made without departing in the least from the general nature and principle of the invention.

In the drawings:

Figure 1 is an elevation of the end of the shaft and a gear thereon.

Figs. 2 and 3 are end views.

Fig. 4 is a somewhat enlarged view in section of the chambered shaft end and the locking device.

A represents a shaft having a collar $a$ and the gear receiving portion A' provided with a spline $a'$ extending the length thereof. The gear receiving end of the shaft is conveniently otherwise cylindrical and is provided with an eccentrically positioned bore B, entering from the end. C designates the gear having a hub part $c$ and a spline channel $c'$ embracing the spline $a'$ and thereby securing the gear to the shaft for rotation therewith.

D represents a gear locking and securing head of circular formation, the diameter of which corresponds with the diameter of the gear receiving portion of the shaft. This head part is conveniently of metal of sufficient thickness to add rigidity thereto and has projecting from one edge thereof a flange $d$ shaped to correspond with the cross section of the spline $a'$. On the inner face of the head D is a lug projection E fashioned to fit the end of the bore B and to rotate therein. This lug projection is eccentrically positioned with relation to the head in a manner similar to the eccentric position of the bore of the gear receiving part of the shaft. The lug has an extended pin part of less diameter than the lug, the extreme end of which is loosely secured in a thimble F, the latter being fashioned to fit loosely in the extreme end of the chamber B.

G represents a coil spring sleeved on the pin and having its ends secured respectively in the end of the thimble and in the lug E. To secure the thimble against rotation, a set screw H is employed entering through the shaft and engaging the thimble, as shown in Fig. 1. By this means any turning of the head D will be resisted by the spring which is normally tensioned to set the head eccentrically of the shaft and with the extension $d$ out of line with the spline. To limit the rotary movement of the head D, a stop pin I is employed secured in the end of the shaft and projecting through a curved elongated slot $d'$ in the head D.

When it is desired to remove or replace a gear, it is only necessary for the operator to turn the head D until the projecting flange thereof is in line with the spline, and owing to the fact that the head is of the same diameter and shape as the end of the shaft the gear can thereupon be easily slid on or off from the end of the shaft. As soon as the gear is in position the head is allowed to spring back a quarter of a turn and by its eccentric mounting the head itself, together with its projecting flange $d$ will lie beyond or overlap the hub of the gear and thus hold it firmly in position with a large area of contact between the same and the hub. This will retain the gear against endwise movement on the shaft.

It has been found that the eccentric mounting of the head is convenient as affording a large surface area to resist the outward movement of the gear on the shaft, but it is to be understood that possibly other arrangements can be resorted to and in some instances the projections $d$ may alone be employed for securing purposes.

In operation a driving shaft will be provided with a gear of a given diameter and the main driven shaft with a gear of different diameter. When it is desired to change the speed of the driven shaft it is only necessary to remove both gears from the shafts and substitute therefor gears of different diameters. This avoids the necessity of the employment of cone pulleys and owing to the simplicity of the construction described the gears can be easily, readily and quickly removed and applied.

The invention can be employed in connection with various types of machines and mechanisms.

Having thus described the invention, what is claimed is:

1. The combination with a shaft, of a wheel member loosely positioned thereon, means for preventing independent rotary movement of the wheel member and shaft, a rotatable head carried by the shaft having an offset part normally positioned to overlie the hub of the wheel but shaped to permit the removal of the wheel upon a turning movement of the head, and means for securing the head on the shaft.

2. The combination with a shaft having a bore in the end thereof and a spline, of a gear slidably movable on the shaft, a rotatable head shaped to correspond with the cross section of the shaft and the spline, and means for turning the head to carry a portion thereof outwardly beyond the surface of the shaft.

3. The combination with a shaft having a chambered end, of a head having a part loosely fitted in the chamber, the shaft having a spline, the head having a projection shaped to correspond with the shape of the spline, and means for holding the said projection out of alinement with the spline.

4. The combination with a shaft having an eccentrically positioned chamber therein, of a head having an eccentrically positioned lug entering the chamber, the diameter of the head being the diameter of the shaft, and means for normally moving the head to cause the edge thereof to project beyond the shaft.

5. The combination with a shaft having a spline, of a head having a projection shaped to correspond with the spline, and means for normally and yieldably positioning the projection out of alinement with the spline.

6. The combination with a shaft having a spline part, of an eccentrically mounted securing head at the end of the shaft, and means for retaining the head in a position to have a part thereof extend beyond the plane of the shaft.

7. The combination with a shaft having an eccentric bore, of a head shaped to correspond with the end of the shaft and having an eccentrically positioned lug fitting the bore, a spring engaging the lug, and means for securing the head on the shaft.

8. The combination with a shaft having a chamber therein of a head fashioned to correspond with the shape of the end of the shaft and having a projection, the shaft having a spline, and said spline having a cross section of a shape to correspond with the projection, a thimble within the bore, means for securing the thimble against rotation, and a spring interposed between the thimble and the head, substantially as described.

9. The combination with a shaft having an eccentric bore and a spline, of a locking head shaped to correspond with the end of the shaft and spline and having an eccentric lug entering the bore, a thimble in the bore, means for securing the thimble against rotation, a stem on the lug loosely entering and secured in the thimble, a spring connected with the thimble at one end and with the lug at the other end, and a stop pin for limiting rotary movement of the head.

In testimony whereof I hereunto affix my signature in the presence of two witnesses.

GEORGE F. CRIPPEN.

Witnesses:
WILLIAM B. HATCH,
FREDERICK C. GILLETTE.